US012802459B2

(12) United States Patent
Kitahori

(10) Patent No.: US 12,802,459 B2
(45) Date of Patent: Nov. 17, 2026

(54) FALLING-DOWN DETECTION APPARATUS, SYSTEM AND METHOD, AND COMPUTER READABLE MEDIUM

(71) Applicant: NEC Corporation, Tokyo (JP)

(72) Inventor: Tomoki Kitahori, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/725,216

(22) PCT Filed: Jan. 17, 2022

(86) PCT No.: PCT/JP2022/001285
§ 371 (c)(1),
(2) Date: Jun. 28, 2024

(87) PCT Pub. No.: WO2023/135781
PCT Pub. Date: Jul. 20, 2023

(65) Prior Publication Data
US 2025/0061725 A1 Feb. 20, 2025

(51) Int. Cl.
*G06V 20/58* (2022.01)
*G06T 7/73* (2017.01)
*G06V 20/56* (2022.01)

(52) U.S. Cl.
CPC ................ *G06V 20/58* (2022.01); *G06T 7/73* (2017.01); *G06V 20/588* (2022.01); *G06T 2207/20044* (2013.01)

(58) Field of Classification Search
CPC .............. G08B 21/043; G08B 21/0476; G08B 21/0469; G06V 40/10; G06V 40/103;
(Continued)

(56) References Cited

U.S. PATENT DOCUMENTS 10,915,762 B1 * 2/2021 Russell ................ G06V 40/103
2020/0103286 A1 * 4/2020 Ikeda ....................... A61B 5/01
(Continued)

FOREIGN PATENT DOCUMENTS

JP 2017-117189 A 6/2017
JP 2018-097185 A 6/2018
(Continued)

OTHER PUBLICATIONS

Oniga et al. "Curb Detection Based on a Multi-Frame Persistence Map for Urban Driving Scenarios," 2008 11th International IEEE Conference on Intelligent Transportation Systems, Beijing, China, 2008, pp. 67-72. (Year: 2008).*
(Continued)

*Primary Examiner* — Nathnael Aynalem
(74) *Attorney, Agent, or Firm* — Sughrue Mion, PLLC

(57) ABSTRACT

A falling-down detection apparatus according to the present invention includes a first detection unit that detects a set of skeletal points of a person present near a vehicle from a first image taken by a first on-board camera mounted on a vehicle traveling on a road, a second detection unit that detects a road area indicating an area of the road from the first image, and a determination unit that determines whether or not the person is lying down on the road based on a positional relationship between a skeletal point and the road area. In particular, the determination unit uses a distance of the skeletal point from a ground calculated from position information of the skeletal point and position information of the road area as the positional relationship.

8 Claims, 12 Drawing Sheets

(58) Field of Classification Search
CPC ...... G06V 40/107; G06V 20/58; G06V 20/56; G06V 40/00; G06V 20/588; G06T 2207/30196; G06T 7/73; G06T 2207/20044; G06T 7/07; G06T 2210/32; G06T 2210/34
USPC ........................................................ 348/148
See application file for complete search history.

(56) References Cited

U.S. PATENT DOCUMENTS

| | | | | |
|---|---|---|---|---|
| 2020/0391708 | A1* | 12/2020 | Mani | B60T 7/22 |
| 2021/0067742 | A1* | 3/2021 | Miki | G06V 40/161 |
| 2022/0108561 | A1* | 4/2022 | Groß | G06V 40/25 |
| 2022/0366716 | A1* | 11/2022 | Yoshida | G06V 40/103 |
| 2023/0074123 | A1* | 3/2023 | Celi | G06T 7/248 |
| 2023/0196896 | A1* | 6/2023 | Hevdeli | G08B 29/24<br>356/4.01 |
| 2023/0196897 | A1* | 6/2023 | Katz | G08B 21/043 |

FOREIGN PATENT DOCUMENTS

| | | | |
|---|---|---|---|
| JP | 2019-153184 | A | 9/2019 |
| JP | 2020-095357 | A | 6/2020 |
| JP | 2021-109498 | A | 8/2021 |
| WO | 2017/056382 | A1 | 4/2017 |

OTHER PUBLICATIONS

Paven et al. "Road Curb Detection and Localization with Monocular Forward-view Vehicle Camera" in IEEE Transactions on Intelligent Transportation Systems, vol. 20, No. 9, pp. 3568-3584, Sep. 2019 (Year: 2019).*

International Search Report for PCT Application No. PCT/JP2022/001285, mailed on Mar. 22, 2022.

JP Office Action for JP Application No. 2023-573782, mailed on Nov. 4, 2025 with English Translation.

* cited by examiner

FALLING-DOWN DETECTION APPARATUS, SYSTEM AND METHOD, AND COMPUTER READABLE MEDIUM

This application is a National Stage Entry of PCT/JP2022/001285 filed on Jan. 17, 2022, the contents of all of which are incorporated herein by reference, in their entirety.

TECHNICAL FIELD

The present invention relates to a falling-down detection apparatus, a system, a method, and a program.

BACKGROUND ART

Patent Literature 1 discloses a technique for detecting the behavior of an elderly person from an image to be monitored taken by an on-board camera. Further, Patent Literature 2 discloses a technique for determining a possibility that a motorcycle running ahead of a vehicle or the like will fall down from an image of the motorcycle taken by an on-board camera.

CITATION LIST

Patent Literature

Patent Literature 1: Japanese Unexamined Patent Application Publication No. 2020-095357

Patent Literature 2: Japanese Unexamined Patent Application Publication No. 2017-117189

SUMMARY OF INVENTION

Technical Problem

Note that there is room for improving the accuracy of the technology for detecting a person who has fallen down near a vehicle from a photographed image taken by an on-board camera.

In view of the above-described problem, an object of the present disclosure is to provide a falling-down detection apparatus, a system, a method, and a program for improving the accuracy of the detection of a person who has fallen down near a vehicle from a photographed image taken by an on-board camera.

Solution to Problem

A falling-down detection apparatus according to a first aspect of the present disclosure includes:

first detection means for detecting a skeletal point of a person present near a vehicle from a first image taken by a first on-board camera;

second detection means for detecting a road area indicating an area of a road from the first image; and determination means for determining whether or not the person is lying down on the road based on a positional relationship between the skeletal point and the road area.

A falling-down detection system according to a second aspect of the present disclosure includes:

a first on-board camera; and a falling-down detection apparatus, in which the falling-down detection apparatus includes:

first detection means for detecting a skeletal point of a person present near a vehicle from a first image taken by the first on-board camera;

second detection means for detecting a road area indicating an area of a road from the first image; and determination means for determining whether or not the person is lying down on the road based on a positional relationship between the skeletal point and the road area.

In a falling-down detection method according to a third aspect of the present disclosure, a computer:

detects a skeletal point of a person present near a vehicle from a first image taken by a first on-board camera;

detects a road area indicating an area of a road from the first image; and determines whether or not the person is lying down on the road based on a positional relationship between the skeletal point and the road area.

A non-transitory computer readable media according to a fourth aspect of the present disclosure stores a falling-down detection program for causing a computer to perform:

a first detection process for detecting a skeletal point of a person present near a vehicle from a first image taken by a first on-board camera;

a second detection process for detecting a road area indicating an area of a road from the first image; and a determination process for determining whether or not the person is lying down on the road based on a positional relationship between the skeletal point and the road area.

Advantageous Effects of Invention

According to the present disclosure, it is possible to provide a falling-down detection apparatus, a system, a method, and a program for improving the accuracy of the detection of a person who has fallen down near a vehicle from a photographed image taken by an on-board camera.

EXAMPLE EMBODIMENT

Figure 1:
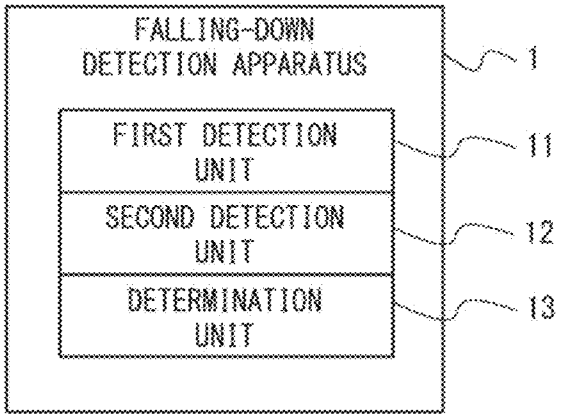
FIG. 1 is a block diagram showing a configuration of a falling-down detection apparatus according to a first example embodiment.

An example embodiment according to the present disclosure will be described hereinafter in detail with reference to the drawings. The same or corresponding elements are assigned the same reference numerals (or symbols), and redundant descriptions thereof will be omitted as appropriate to clarify the explanation.

First Example Embodiment

FIG. 1 is a block diagram showing a configuration of a falling-down detection apparatus 1 according to a first example embodiment. The falling-down detection apparatus 1 is an information processing apparatus for detecting whether a person has fallen down. The falling-down detection apparatus 1 includes a first detection unit 11, a second detection unit 12, and a determination unit 13.

The first detection unit 11 detects skeletal points of a person present near a vehicle from a first image taken by a first on-board camera (not shown). The second detection unit 12 detects a road area indicating an area of a road from the first image. Note that the first and second detection units 11 and 12 may detect the skeletal points and the road area, respectively, by image recognition process. The determination unit 13 determines whether or not the person is lying down on the road based on a positional relationship between the skeletal points and the road area.

Figure 2:
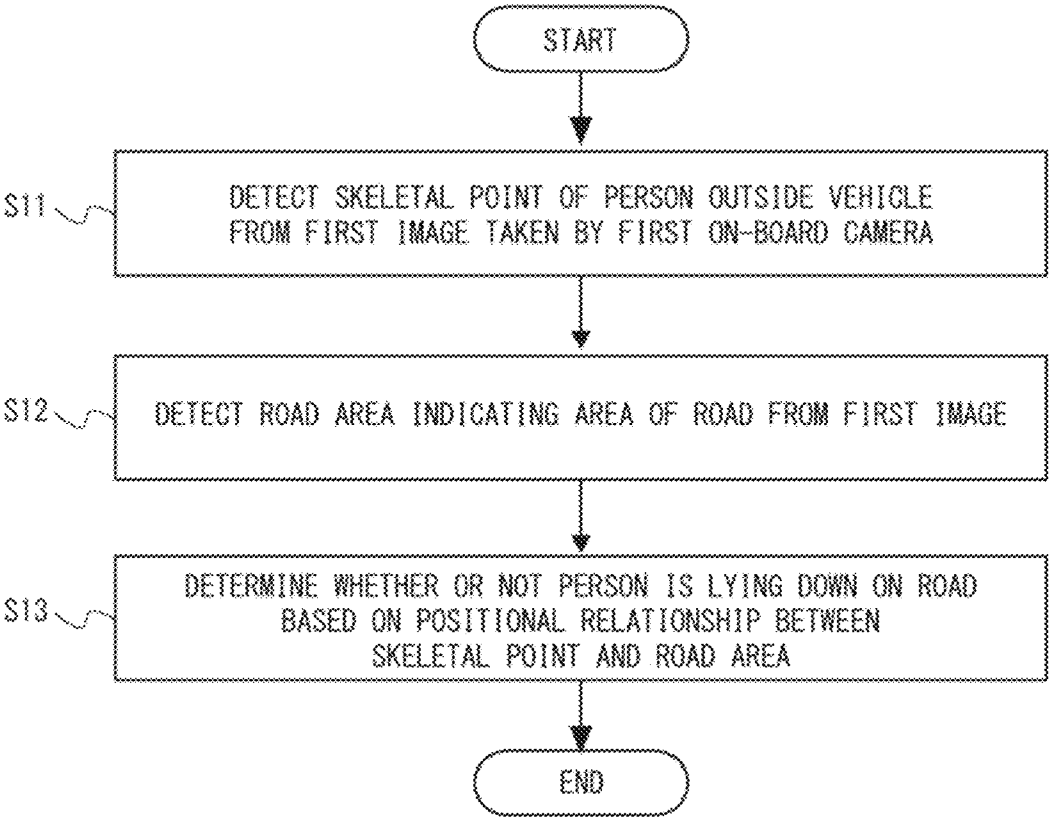
FIG. 2 is a flowchart showing a flow of a falling-down detection method according to the first example embodiment.

FIG. 2 is a flowchart showing a flow of a falling-down detection method according to the first example embodiment. Firstly, the first detection unit 11 detects skeletal points of a person present near a vehicle from a first image taken by a first on-board camera (S11). Next, the second detection unit 12 detects a road area indicating an area of a road from the first image (S12). Then, the determination unit 13 determines whether or not the person is lying down on the road based on a positional relationship between the skeletal points and the road area (S13).

As described above, the falling-down detection apparatus 1 according to this example embodiment detects skeletal points of a person present near the vehicle by analyzing an image taken by the on-board camera, and by doing so, detects the posture of the person. Therefore, the falling-down detection apparatus 1 can specify a positional relationship of a part of the body of the person on the road, for example, coordinate information of each part of the body in a 3D (three-dimensional) space. Further, the falling-down detection apparatus 1 can specify coordinate information of the road area, i.e., the ground, in the 3D space by analyzing the same photographed image. Since the falling-down detection apparatus 1 can recognize the positional relationship between the skeletal points and the road area, it can accurately determine whether or not the person is lying down on the road and thereby can accurately detect the person who has fallen down.

Note that the falling-down detection apparatus 1 includes a processor, a memory, and a storage device as a configuration that is not shown in the drawings. Further, a computer program for implementing processes of a falling-down detection method according to this example embodiment is stored in the storage device. Then, the processor loads a computer program and the like from the storage device onto the memory and executes the loaded computer program. In this way, the processor implements the functions of the first and second detection units 11 and 12, and the determination unit 13.

Alternatively, each of the components of the falling-down detection apparatus 1 may be implemented by dedicated hardware. Further, some or all of the components of each apparatus may be implemented by general-purpose or dedicated circuitry, a processor, or a combination thereof. These components or the like may be formed by a single computer chip or by a plurality of computer chips connected to each other through a bus. Some or all of the components of each apparatus may be implemented by a combination of the above-mentioned circuitry or the like and a program. Further, a CPU (Central Processing Unit), a GPU (Graphics Processing Unit), an FPGA (Field-Programmable Gate Array), a quantum processor (quantum computer control chip) or the like may be used as the processor.

Second Example Embodiment

Figure 3:
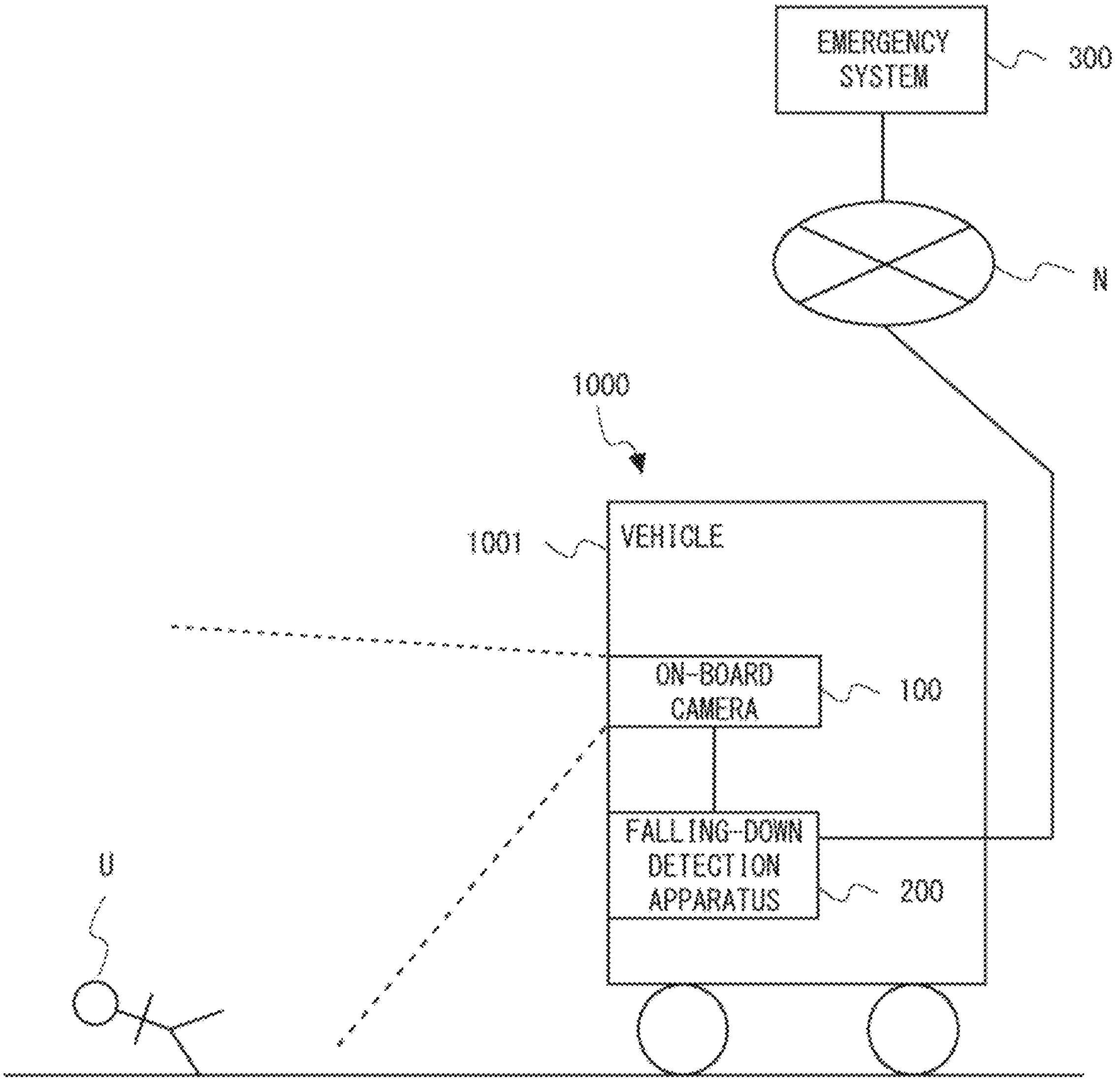
FIG. 3 is a block diagram showing an overall configuration including a falling-down detection system according to a second example embodiment.

A second example embodiment is a specific example of the above-described first example embodiment. FIG. 3 is a block diagram showing an overall configuration including a falling-down detection system 1000 according to the second example embodiment. The falling-down detection system 1000 is an information system for detecting, among persons near a vehicle 1001, a person who has fallen down. In FIG. 3, an example in which the falling-down detection system 1000 detects (i.e., determines) whether or not a person U is lying down on a roadway on which the vehicle 1001 is traveling is shown. However, the person U may be lying down on a sidewalk. Therefore, in the following description, the term "road" includes a roadway, a sidewalk, and the like.

The vehicle 1001 includes an on-board camera 100 and a falling-down detection apparatus 200. The on-board camera 100 is a photographing apparatus that photographs a view(s) in at least one of the traveling direction (front), the backward direction (rear), and the lateral directions of the vehicle 1001. The on-board camera 100 photographs a view(s) in a shooting range(s) at predetermined intervals and outputs the photographed images to the falling-down detection apparatus 200. The on-board camera 100 is an example of the above-described first on-board camera.

The falling-down detection apparatus 200 is an example of the above-described falling-down detection apparatus 1 and is an information processing apparatus installed in the vehicle 1001. The falling-down detection apparatus 200 is, for example, an ECU (Electronic Control Unit) that controls the vehicle 1001. Alternatively, the falling-down detection apparatus 200 may be configured over a plurality of computers in a redundant manner, and each functional block thereof may be implemented by a plurality of computers.

The falling-down detection apparatus 200 is connected to an emergency system 300 through a network N so that they can communicate with each other. Note that the network N is a communication network examples of which include a wireless communication network, a cellular telephone network, and the like. The network N may include the Internet. Further, there is no restriction on the type of the communication protocol used for the communication network.

The falling-down detection apparatus 200 analyzes an image received from the on-board camera 100, determines whether or not a person U shown in the image has fallen down. Then, when the falling-down detection apparatus 200 determines that the person has fallen down, it notifies the emergency system 300 of the fact that it has detected the person who has fallen down and of the current position through the network N.

The emergency system 300 is an information system that issues an instruction for sending an ambulance or the like to a place indicated by the present position in response to the notification from the falling-down detection apparatus 200.

Figure 4:
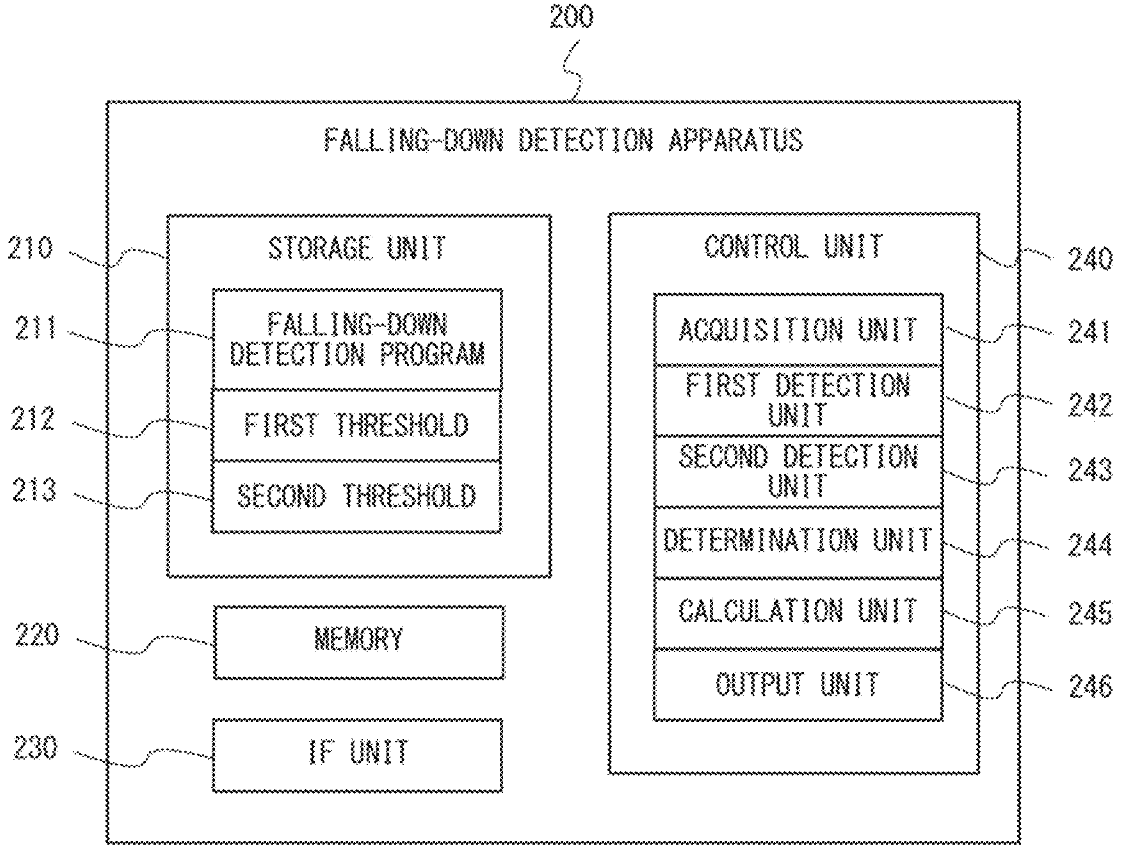
FIG. 4 is a block diagram showing a configuration of a falling-down detection apparatus according to the second example embodiment.

FIG. 4 is a block diagram showing a configuration of the falling-down detection apparatus 200 according to the second example embodiment. The falling-down detection apparatus 200 includes a storage unit 210, a memory 220, an IF (InterFace) unit 230, and a control unit 240. The storage unit 210 is an example of a storage device such as a hard disk drive or a flash memory. The storage unit 210 stores a falling-down detection program 211, a first threshold 212, and a second threshold 213. The falling-down detection program 211 is a computer program for implementing a falling-down detection process or the like according to the second example embodiment. The first threshold 212 is a threshold for the distance between the head of the person U and the ground for determining whether the person U is lying down. The second threshold 213 is a threshold for the distance between a knee(s) of the person U and the ground for determining whether the person U is lying down.

The memory 220 is a volatile storage device such as RAM (Random Access Memory) and serves as a storage area for temporarily holding information when the control unit 240 is operating. The IF unit 230 is a communication interface between the inside of the falling-down detection apparatus 200 and the on-board camera 100 and the network N.

The control unit 240 is a processor, i.e., a control apparatus, that controls each component of the falling-down detection apparatus 200. The control unit 240 loads the falling-down detection program 211 from the storage unit 210 onto the memory 220 and executes the loaded falling-down detection program 211. In this way, the control unit 240 implements the functions of an acquisition unit 241, a first detection unit 242, a second detection unit 243, a determination unit 244, a calculation unit 245, and an output unit 246.

The acquisition unit 241 acquires an image taken by and output from the on-board camera 100.

The first detection unit 242 is an example of the above-described first detection unit 11. The first detection unit 242 detects skeletal points of the person U present near the vehicle from a first image taken by the on-board camera 100. The first detection unit 242 detects an area of the body shape of the person U in the image by a first image recognition process, and detects a set of skeletal points of the person U from the detected area. Note that the skeletal points are information indicating characteristic parts, i.e., representative points, of the skeleton of the person U. The skeletal points may include coordinate information (information indicating a position) in a 3D (three-dimensional) space and information indicating a part(s) of the body. That is, the skeletal points may include information indicating, in addition to information indicating a position(s) when the road is assumed as a horizontal plane, information indicating a height(s) from the road. Further, examples of the part of the body include, but are not limited to, a head, shoulders, elbows, hands, a hip, knees, and feet. Further, the first detection unit 242 may detect the posture of the person U by the first image recognition process. Further, the first detection unit 242 may detect a set of skeletal points of the person U from a plurality of images successively taken by the on-board camera 100, i.e., from video data taken by the on-board camera 100.

A known skeleton detection algorithm, a posture inference algorithm, or the like may be used for the first image recognition process. Further, a first AI (Artificial Intelligence) model may be used for the first image recognition process, in which an image obtained by photographing a person is input to the AI model and a set of skeletal points of the person is output therefrom. Note that the first AI model is preferably a trained model that has been machine-trained by using learning data including images of various postures of persons when they have fallen down, when they have stooped, when they are standing, and the like, and correct answer data of a set of skeletal points of persons in respective images.

The second detection unit 243 is an example of the above-described second detection unit 12. The second detection unit 243 detects a road area indicating an area of a road from the first image. The second detection unit 243 detects a road area in an image by a second image recognition process. Note that the road area is preferably coordinate information (information indicating a position) in the same 3D space as the space from which the above-described skeletal points have been detected. However, when there is no difference in the level of the road, 2D (two-dimensional) coordinate information including no height information may be used as the information indicating a position.

For the second image recognition process, a segmentation technique such as instance segmentation or semantic segmentation may be used. Further, in the second image recognition process, a label indicating the type of an area may be attached to each pixel in an image. For example, for the second image recognition process, a second AI model that attaches, to each pixel in an input image, a label indicating whether or not the pixel corresponds to a road and outputs the obtained image may be used. Note that the second AI model is preferably a trained model that has been machine-trained by using learning data including a plurality of images obtained by photographing roads by various on-board cameras, and correct answer data in which to each pixel in each image, a label indicating whether or not the pixel corresponds to a road is attached.

The determination unit 244 is an example of the above-described determination unit 13. The determination unit 244 determines whether or not the person U is lying down on the road based on a positional relationship between the skeletal points and the road area. In particular, the determination unit 244 makes a decision by using a distance(s) of a skeletal point(s) from the ground calculated from the position(s) of the skeletal point(s) and the position of the road area as the positional relationship.

Further, the determination unit 244 may also determine whether or not a set of skeletal points has been detected from the image by the first detection unit 242. Further, the determination unit 244 may also determine whether or not the road area has been detected from the image by the second detection unit 243.

Further, the determination unit 244 also determines whether or not a skeletal point(s) of the head is detected.

When the skeletal point of the head is detected, the determination unit 244 determines whether or not a first distance between the head and the ground calculated by the calculation unit 245 (which will be described later) is equal to or shorter than the first threshold 212. When the first distance is equal to or shorter than the first threshold 212, the determination unit 244 determines that the person U is lying down.

The determination unit 244 determines whether or not a skeletal point(s) of a knee(s) has been detected. When the skeletal point of the knee has been detected, the determination unit 244 determines whether or not a second distance between the knee and the ground calculated by the calculation unit 245 is equal to or shorter than the second threshold 213. When the second distance is equal to or shorter than the second threshold 213, the determination unit 244 determines that the person U is lying down.

In particular, when no skeletal point corresponding to the head of the person U has been detected by the first detection unit 242, the determination unit 244 may determine whether or not the second distance is equal to or shorter than the second threshold 213. In this way, when the head is detected, the determination process using the second threshold 213 can be skipped, so that the processing cost can be reduced.

The calculation unit 245 is an example of the first calculation means and the second calculation means. When the skeletal point of the head of the person U has been detected by the first detection unit 242, the calculation unit 245 calculates the first distance of the skeletal point of the head from the ground based on the road area. Specifically, the calculation unit 245 calculates the first distance from the position of the skeletal point of the head and the position of the road area. For example, the calculation unit 245 may compare the coordinates of the position of the head on the plane with the coordinates of the position of the road area on the plane, and thereby calculate a difference between these coordinates in the height direction at the same point as the first distance. Alternatively, the calculation unit 245 may calculate the shortest distance between the position of the head and the position of the road area as the first distance.

Further, when the skeletal point(s) of the knee(s) of the person U has been detected by the first detection unit 242, the calculation unit 245 calculates the second distance of the skeletal point of the knee from the ground based on the road area. Specifically, the calculation unit 245 calculates the second distance by replacing the skeletal point of the head in the above-described calculation process of the first distance with the skeletal point of the knee.

When the determination unit 244 determines that the person U shown in the image has fallen down, the output unit 246 outputs information indicating at least the detection of the person who has fallen down. For example, when the vehicle 1001 is equipped with a display device, the output unit 246 may output an image including the person U and information indicating that the person U has fallen down to the display device and thereby display the image on the screen of the display device. Further, in the case where the vehicle 1001 can acquire current position information (current position) by a GPS (Global Positioning System) function or the like, it may transmit information indicating the detection of the person who has fallen down and the current position to the emergency system 300 through the network N.

Figure 5:
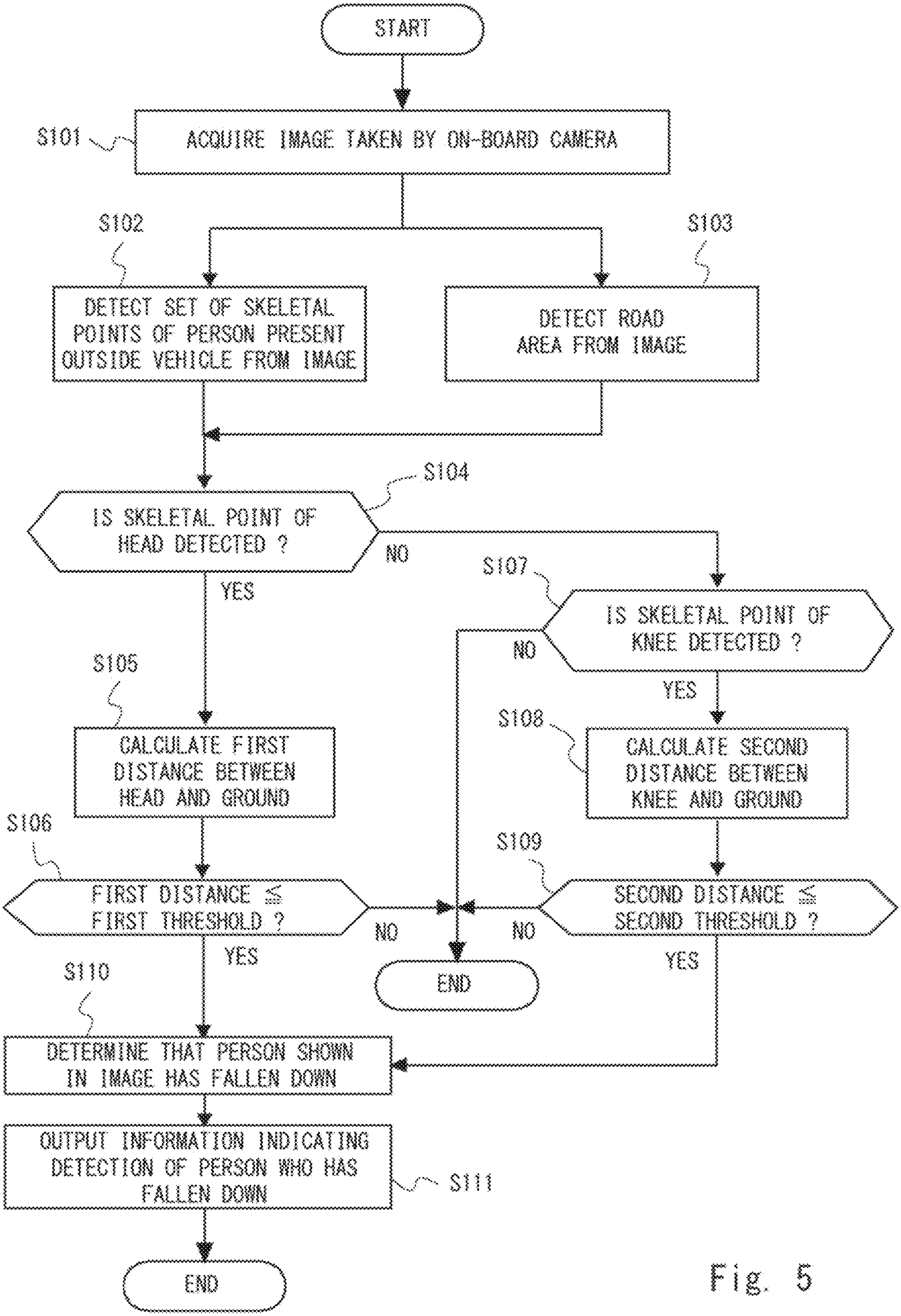
FIG. 5 is a flowchart showing a flow of a falling-down detection process according to the second example embodiment.

FIG. 5 is a flowchart showing a flow of a falling-down detection process according to the second example embodiment. Firstly, the on-board camera 100 photographs a road and outputs the photographed image to the falling-down detection apparatus 200. In response to this, the falling-down detection apparatus 200 acquires the image taken by the on-board camera 100 (S101). Next, the falling-down detection apparatus 200 detects a set of skeletal points of a person present near the vehicle from the image (S102). Further, the falling-down detection apparatus 200 detects a road area from the image (S103). Here, it is assumed that a set of skeletal points of a person and a road area have been detected from the image.

After the steps S102 and S103, the falling-down detection apparatus 200 determines whether or not a skeletal point of the head has been detected (S104). When the skeletal point of the head has been detected (Yes in S104), the falling-down detection apparatus 200 calculates a first distance between the head and the ground (S105). Then, the falling-down detection apparatus 200 determines whether or not the first distance is equal to or shorter than a first threshold (S106). When the first distance is equal to or shorter than the first threshold (Yes in S106), the falling-down detection apparatus 200 determines the person U shown in the image has fallen down (S110). This is because when the head is within a certain distance from the ground, a possibility that the person U is lying down is extremely high. Therefore, by preferentially making a decision on the skeletal point of the head over those of other parts, the processing load required for the calculation and determination in regard to the distances of the other parts is reduced, and the speed of the detection of a person who has fallen down is also improved.

When the skeletal point of the head has not been detected in the step S104 (No in S104), the falling-down detection apparatus 200 determines whether or not a skeletal point(s) of a knee(s) has been detected (S107). When the skeletal point of the knee has been detected (Yes in S107), the falling-down detection apparatus 200 calculates a second distance between the knee and the ground (S108). Then, the falling-down detection apparatus 200 determines whether or not the second distance is equal to or shorter than a second threshold (S109). When the second distance is equal to or shorter than the second threshold (Yes in S109), the falling-down detection apparatus 200 determines that the person U shown in the image has fallen down (S110). For example, depending on the direction in which the person U has fallen down, his/her head may not be photographed from the on-board camera 100, and hence no skeletal point of the head may be detected. In such a case, when, among the other parts, a knee(s) is within a certain distance from the ground, there is a high possibility that the person U is lying down or at least fallen down on his/her knee(s). Therefore, when no skeletal point of the head has been detected from the image, a decision is made by using the skeletal point(s) of the knee(s), so that a more reasonable decision can be made. Meanwhile, when the head is detected, the processing load can be reduced by skipping the calculation of the second distance and the decision process using the skeletal point of the knee.

On the other hand, when the first distance is longer than the first threshold in the step S106 or when the second distance is longer than the second threshold in the step S109, the falling-down detection apparatus 200 does not determine that the person U shown in the image has fallen down and finishes the series of processes. Further, when no skeletal point of a knee has been detected in the step S107, the falling-down detection apparatus 200 also finishes the series of processes. Note that when no skeletal point of a knee has been detected in the step S107, the falling-down detection apparatus 200 may calculate a third distance between a skeletal point of another part and the ground. Then, when the third distance is equal to or shorter than a third threshold, the falling-down detection apparatus 200 may determine that the person U shown in the image has fallen down. Examples of other parts include, but are not limited to, shoulders, elbows, hands, a hip, and feet. Further, the detection and determination of the knee in the step S107 may be performed before the detection and determination of the head in the step S104. Alternatively, the detection and determination of a part other than the head and the knees may be performed before the step S104.

After the step S110, the falling-down detection apparatus 200 outputs information indicating the detection of a person who has fallen down as described above (S111).

Figure 6:
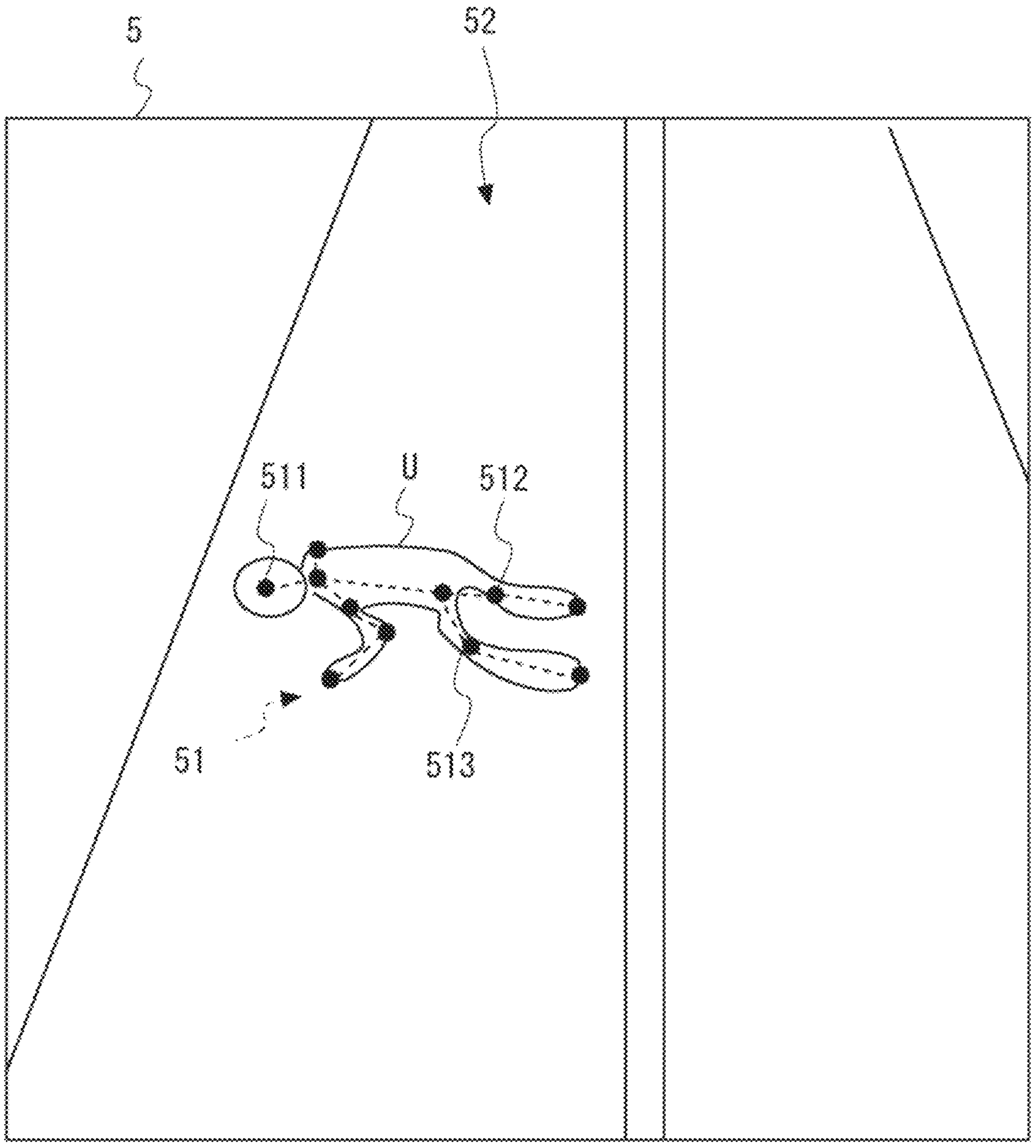
FIG. 6 is a diagram for explaining a concept as to how to detect that a person has fallen down according to the second example embodiment.

FIG. 6 is a drawing for explaining a concept as to how to detect that a person has fallen down according to the second example embodiment. A photographed image 5 is an example of an image taken by the on-board camera 100 of the vehicle 1001. In this example, it is shown that the first detection unit 242 has detected a set of skeletal points 51 from the photographed image 5, and the second detection unit 243 has detected a road area 52 from the photographed image 5. The set of skeletal points 51 includes a plurality of skeletal points of a person U. In particular, the set of skeletal points 51 includes a skeletal point 511 of the head, and skeletal points 512 and 513 of the knees.

In the example shown in FIG. 6, it is assumed that a first distance between the skeletal point 511 of the head and the ground is equal to or shorter than a first threshold, and hence it has been detected that the person U has fallen down. In this state, the calculation and determination using the skeletal points 512 and 513 of the knees are not performed, so that the person who has fallen down can be detected in a shorter time. Further, if the skeletal point 511 of the head has not been detected and the second distance between the detected skeletal points 512 and 513 of the knees and the ground is equal to or shorter than the second threshold, it is still possible to detect that the person U has fallen down. Therefore, it is possible to improve the accuracy of the detection of a person who has fallen down near the vehicle from a photographed image taken by the on-board camera.

Third Example Embodiment

Figure 7:
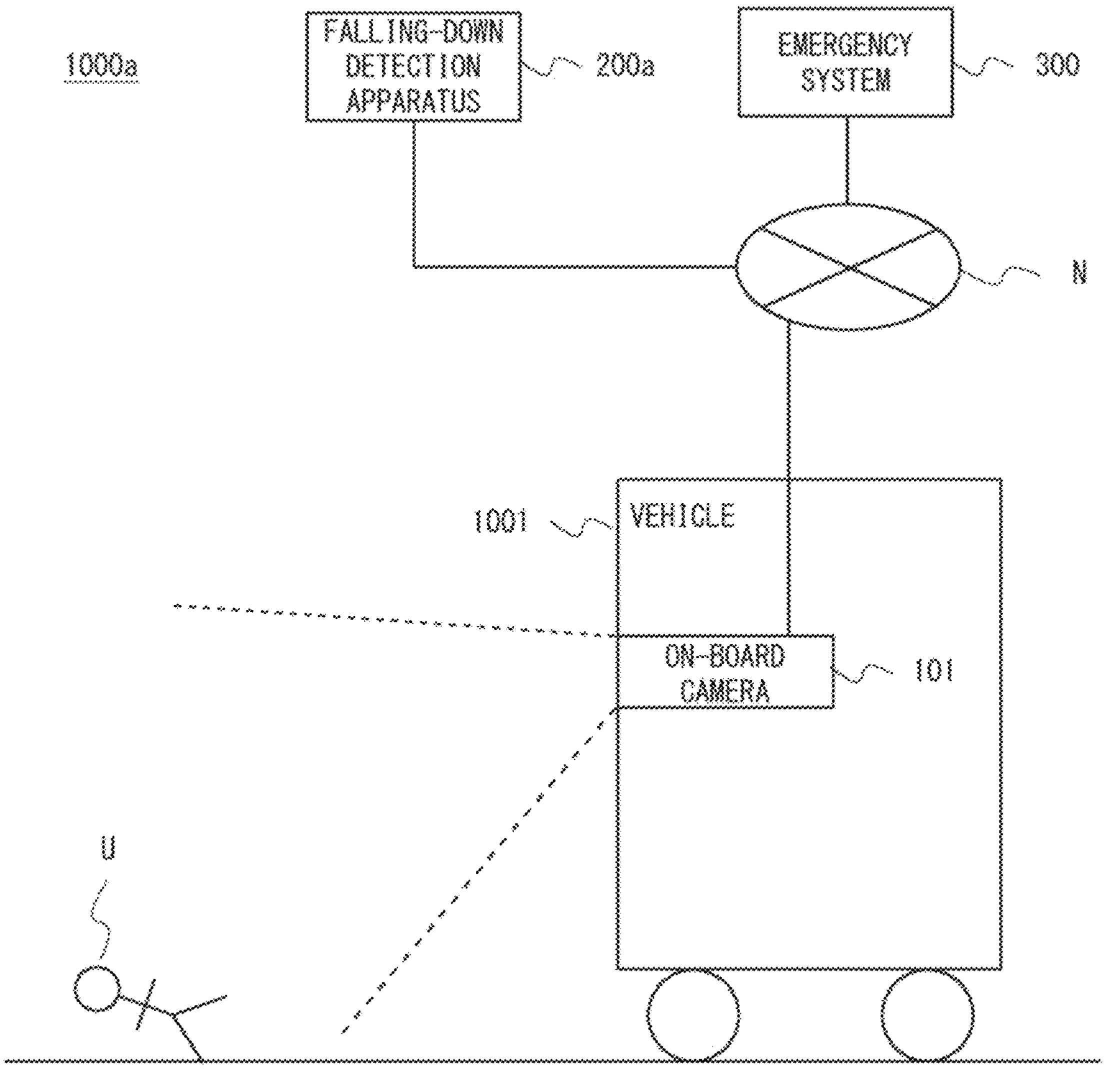
FIG. 7 is a block diagram showing an overall configuration including a falling-down detection system according to a third example embodiment.

A third example embodiment is a modified example of the above-described second example embodiment. FIG. 7 is a block diagram showing an overall configuration including a falling-down detection system 1000*a* according to the third example embodiment. Compared with the above-described FIG. 3, a falling-down detection apparatus 200*a* according to the third example embodiment is an example of a falling-down detection apparatus that is installed as a server near the vehicle 1001. That is, the falling-down detection apparatus 200*a* is connected to an on-board camera 101 and an emergency system 300 through a network N so that they can communicate with each other. The on-board camera 101 has a wireless communication function in addition to the functions of the above-described on-board camera 100. Therefore, the on-board camera 101 is connected to the network N through wireless communication. The on-board camera 101 transmits a photographed image and the current position to the falling-down detection apparatus 200*a* through the network N.

The falling-down detection apparatus 200*a* acquires an image from the on-board camera 101 through the network N. The falling-down detection apparatus 200*a* performs a falling-down detection process based on the acquired image in a manner similar to that shown in the above-described steps S102 to S110 in FIG. 5. Then, when it is determined that the person U shown in the image has fallen down, the falling-down detection apparatus 200*a* transmits information indicating the detection of the person who has fallen down and the current position to the emergency system 300 through the network N. Further, the falling-down detection apparatus 200*a* may transmit the information indicating the detection of the person who has fallen down to the vehicle 1001 through the network N and thereby display the information on a display device provided in the vehicle 1001.

As described above, the same effects as those of the above-described second example embodiment can also be achieved in the third example embodiment. Further, in the third example embodiment, there is no need to install a sophisticated on-board apparatus equivalent to the falling-down detection apparatus 200 in the vehicle 1001. Further, in the third example embodiment, since the falling-down detection process is performed near the vehicle 1001, the power consumption of the vehicle 1001 can be reduced.

Fourth Example Embodiment

A fourth example embodiment is an improved example of the above-described second or third example embodiment. It can be said that although a person who has fallen down can be accurately detected in the above-described second example embodiment and the like, when the person who has fallen down immediately stands up, the necessary to notify the emergency system 300 is low. That is, there are cases where even when a person who has fallen down has been detected by the falling-down detection apparatus 200 or the like, the occupant (e.g., the driver or a passenger) of the vehicle 1001 cannot decide whether or not he/she should notify the emergency system 300. For example, even when there is a person who is lying down on the road, the occupant of the vehicle 1001 cannot decide whether or not he/she should report it to the emergency system 300. Alternatively, even when a person who has fallen down has been detected by the falling-down detection apparatus 200 or the like, the occupant of the vehicle 1001 may hesitate to report it to the emergency system 300 because he/she thinks that other persons may rescue the person and report it. As a result, there is a possibility that the rescue or the like to the person who has fallen down is delayed. Therefore, a falling-down detection apparatus according to the fourth example embodiment calculates a time period during which a person who has fallen down remains lying on the ground (hereinafter also referred to as falling-down continuation time period) from a plurality of images successively taken by the on-board camera, and notifies the emergency system 300 or the like when the falling-down continuation time period exceeds a predetermined time period.

Figure 8:
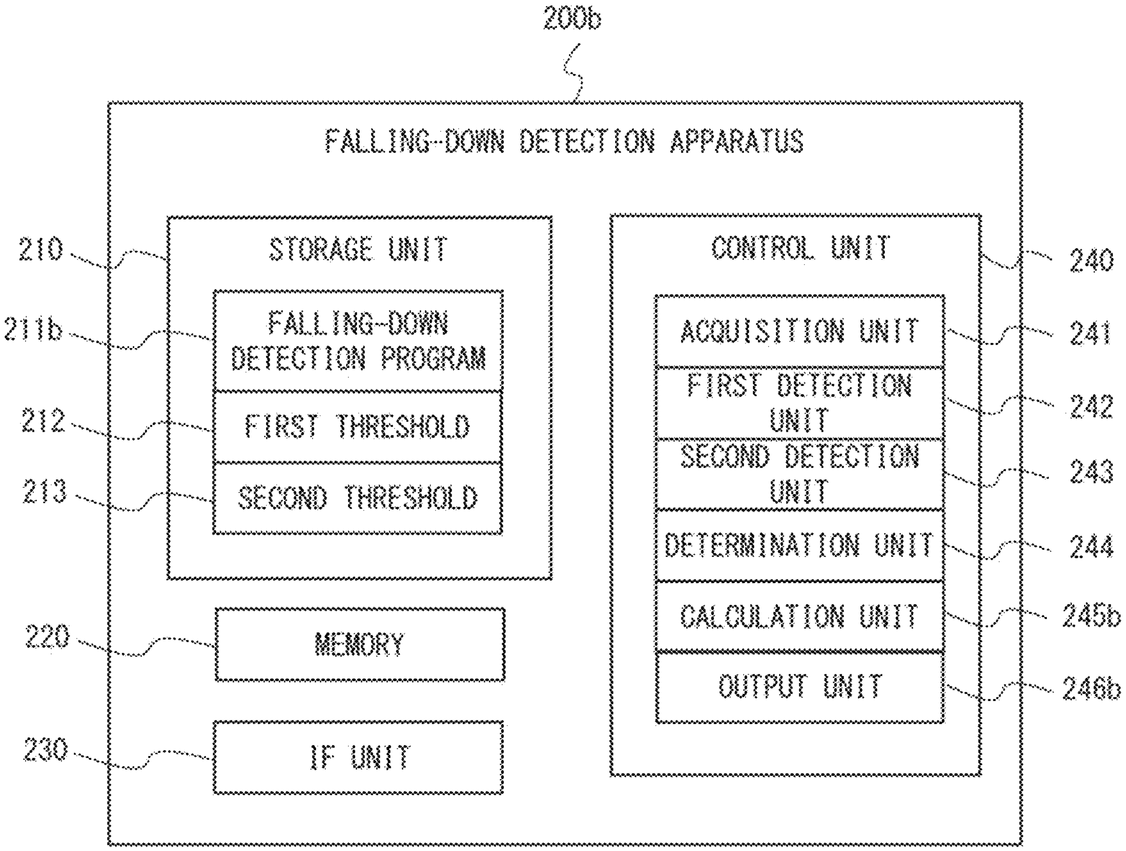
FIG. 8 is a block diagram showing a configuration of a falling-down detection apparatus according to the fourth example embodiment.

FIG. 8 is a block diagram showing a configuration of a falling-down detection apparatus 200*b* according to the fourth example embodiment. In the falling-down detection apparatus 200*b*, a falling-down detection program 211*b*, a calculation unit 245*b*, and an output unit 246*b* are changed from those shown in the above-described FIG. 4. The falling-down detection program 211*b* is a computer program for implementing a falling-down detection process or the like according to the fourth example embodiment. The control unit 240 loads the falling-down detection program 211*b* from the storage unit 210 onto the memory 220 and executes the loaded falling-down detection program 211*b*. In this way, the control unit 240 implements the functions of the calculation unit 245*b* and the output unit 246*b* in addition to the functions of the above-described acquisition unit 241, the first detection unit 242, the second detection unit 243, and the determination unit 244.

The calculation unit 245*b* is an example of third calculation means for calculating, based on the positional relationship between a skeletal point(s) detected from the first image and the road area, the falling-down continuation time period of the person U based on a first subsequent image that is taken, when it is determined that the person U is lying down, after the first image is taken. The output unit 246*b* is an example of notification means for sending, when the falling-down continuation time period is equal to or longer than a predetermined time period, a notification to that effect to a predetermined notification destination. Note that the predetermined time period is set in the falling-down detection apparatus 200*b* in advance and can be changed as appropriate.

Figure 9:
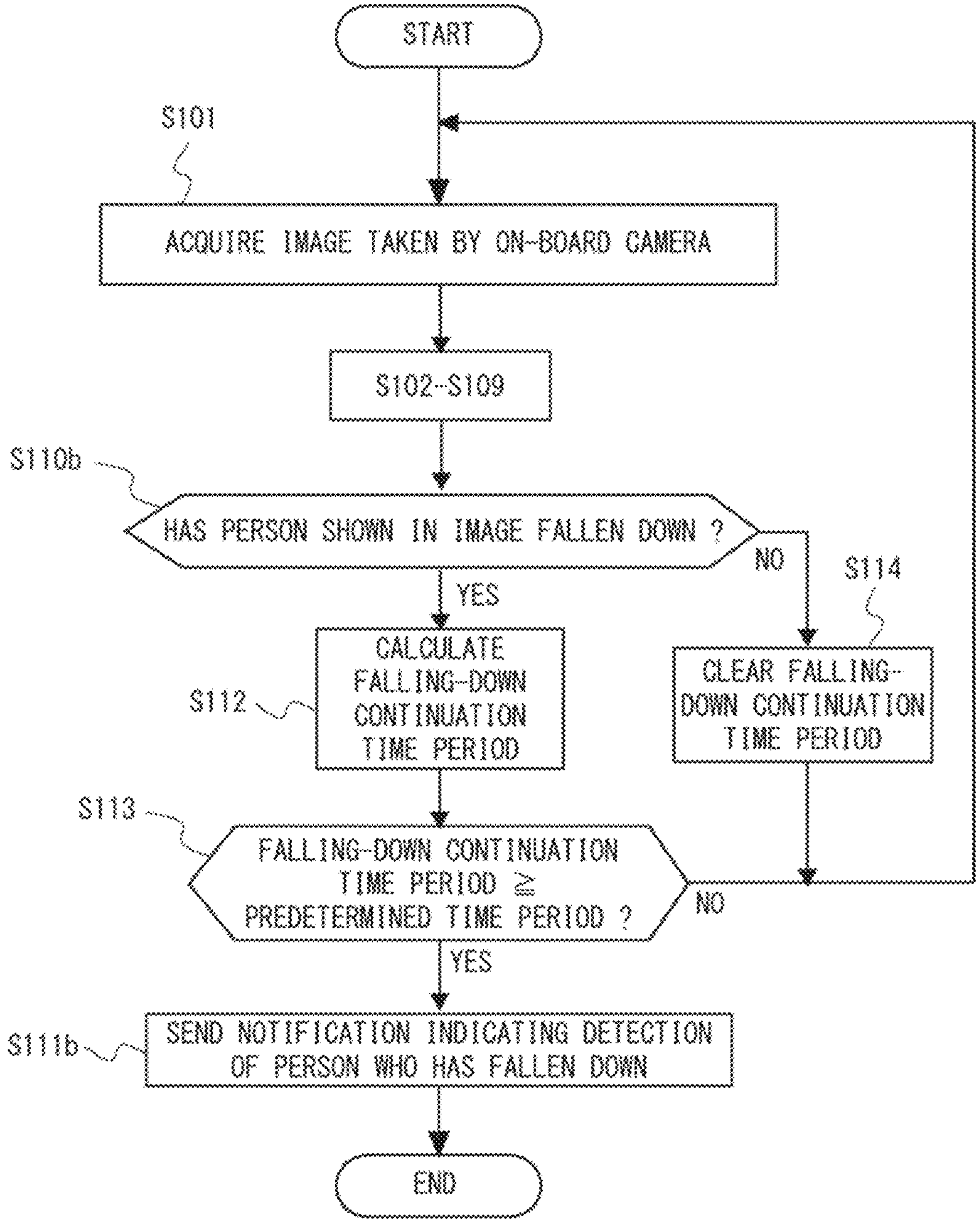
FIG. 9 is a flowchart showing a flow of a falling-down detection process according to the fourth example embodiment.

FIG. 9 is a flowchart showing a flow of a falling-down detection process according to the fourth example embodiment. Firstly, the acquisition unit 241 acquires a first image taken by the on-board camera 101 (S101). Then, steps S102 to S109 are performed as described above. After that, the determination unit 244 determines whether or not a person U shown in the first image has fallen down (S110*b*). In the case of Yes in the step S106 or S109, the determination unit 244 determines that the person U shown in the first image has fallen down. In this case, the calculation unit 245*b* calculates a falling-down continuation time period (S112). For example, when it is determined that the person U has fallen down in the first image for the first time, the calculation unit 245*b* starts counting the falling-down continuation time period. Then, the determination unit 244 determines whether or not the falling-down continuation time period is equal to or longer than a predetermined time period (S113).

Further, when it is determined that the person U shown in the first image has not fallen down in the step S110*b*, the calculation unit 245*b* clears (i.e., initializes) the falling-down continuation time period (S114). After the step S114 or when it is determined that the falling-down continuation time period is shorter than the predetermined time period in the step S113, the process returns to the step S101.

Then, the acquisition unit 241 acquires a first subsequent image taken by the on-board camera 101 (S101). The first subsequent image is an image taken by the on-board camera 101 after the above-described first image is taken. Then, the falling-down detection apparatus 200*b* performs the steps S102 to S109 for the first subsequent image.

Then, when it is determined that the person U shown in the first subsequent image has fallen down in the step S110*b*, the calculation unit 245*b* calculates the falling-down continuation time period from when the first image is taken (S112). For example, the calculation unit 245*b* adds a time period between when the first image is taken and when the first subsequent image is taken to the falling-down continuation time period calculated immediately before. That is, the calculation unit 245*b* updates the falling-down continuation time period. Then, the determination unit 244 determines whether or not the updated falling-down continuation time period is equal to or longer than the predetermined time period (S113).

When it is determined that the person U shown in the first subsequent image has not fallen down in the step S110*b*, the calculation unit 245*b* clears (i.e., initializes) the falling-down continuation time period (S114). Note that even when it is determined that the person has not fallen down, the calculation unit 245*b* does not necessarily have to immediately clear the falling-down continuation time period. For example, the calculation unit 245*b* may calculate (i.e., counts) the number of times of successive determinations in each of which it is determined the person has not fallen down in the step S110*b*, and clear the falling-down continuation time period when the number of times becomes equal to or greater than a predetermined number. In this way, it is possible to eliminate temporary noises, such as when it is mistakenly determined that the person has not fallen down. In this process, the calculation unit 245*b* also clears (i.e., initializes) the number of times. After the step S114 or when it is determined that the falling-down continuation time period is shorter than the predetermined time period in the step S113, the process returns to the step S101.

On the other hand, when it is determined that the falling-down continuation time period is equal to or longer than the predetermined time period in the step S113, the output unit 246*b* sends a notification indicating the detection of the person who has fallen down as described above (S111*b*). Specifically, the output unit 246*b* transmits the information indicating the detection of the person who has fallen down and the current position of the vehicle 1001 to the emergency system 300 through the network N. Note that the output unit 246*b* may output the information indicating the detection of the person who has fallen down to a display device of the vehicle 1001.

As described above, in the fourth example embodiment, a falling-down continuation time period is measured, and when the falling-down continuation time period becomes equal to or longer than the predetermined time period, a notification is sent to the emergency system 300 or the like. As a result, it is possible to notify the emergency system 300 of the person has fallen down and hence badly requires rescue. Further, since the accuracy of the falling-down detection process is substantially equal to that of the above-described second example embodiment and the like, it is possible to reduce the possibility of an oversight of a person who has fallen down (a person requiring rescue). Further, similarly to the above-described second example embodiment and the like, the falling-down detection apparatus 200*b* sends a notification of the current position information of the vehicle 1001. Therefore, the emergency system 300 can find the position of the person requiring rescue more accurately. Further, the falling-down detection apparatus 200*b* automatically notifies the emergency system 300 without requiring any operation performed by the occupant of the vehicle 1001 and thereby reduces the notification time.

Further, when it is detected that a person has fallen down in the first image, but it is determined that the person has not fallen down in the first subsequent image taken after the first image, no notification is sent to the emergency system 300 or the like. For example, when a person U has fallen down once on a road, but then stands up in a short time, no notification is sent. That is, when a person has just stumbled down, no notification is sent. Therefore, it is possible to prevent an excessive notification (e.g., an unnecessary notification) from being sent.

Fifth Example Embodiment

A fifth example embodiment is a modified example of the above-described second to fourth example embodiments. A falling-down detection apparatus according to the fifth example embodiment determines whether or not a person is lying down on a road more accurately by using a plurality of images taken by a plurality of on-board cameras mounted on a plurality of vehicles. In particular, a determination unit determines whether or not a person is lying down on a road based also on a positional relationship between a skeletal point(s) detected from a second image taken by a second on-board camera mounted on a second vehicle other than the first vehicle on which the first on-board camera is mounted and the road area.

Figure 10:
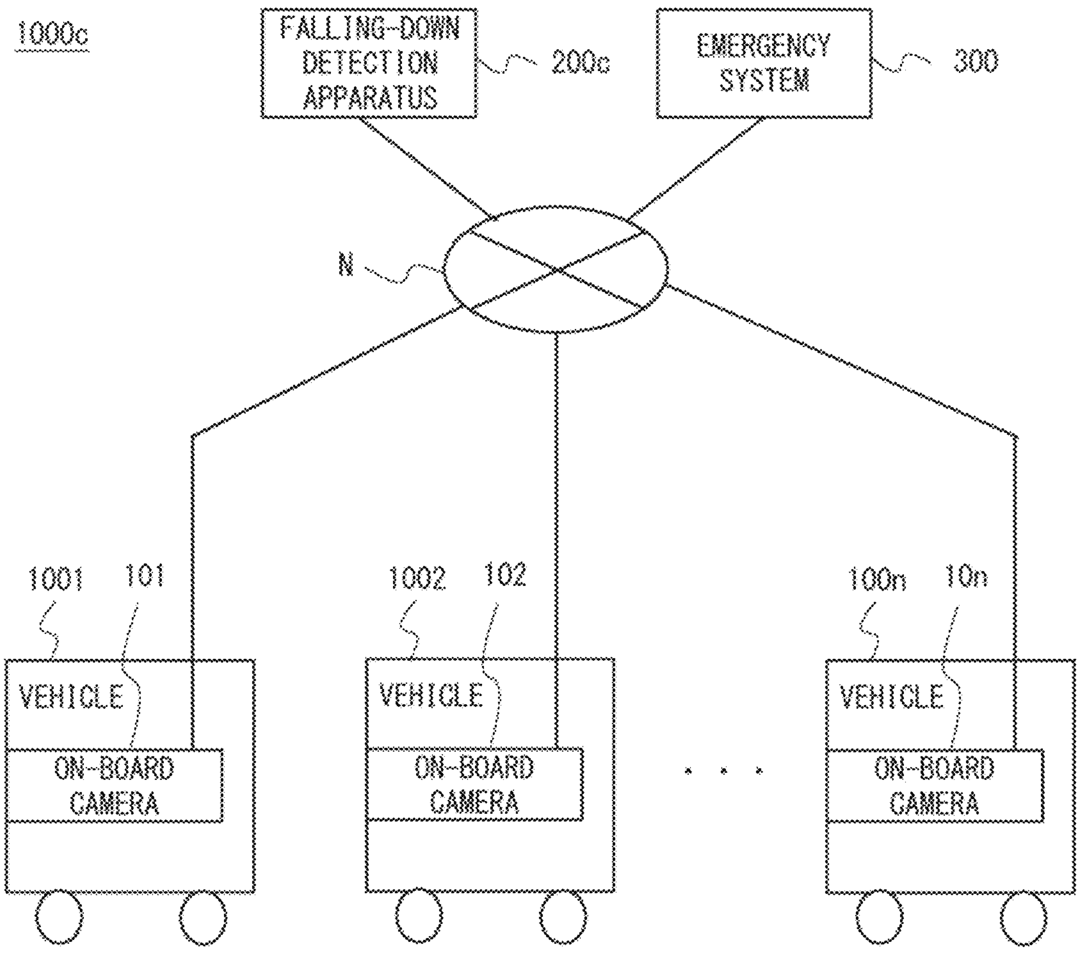
FIG. 10 is a block diagram showing an overall configuration including a falling-down detection system according to a fifth example embodiment.

FIG. 10 is a block diagram showing an overall configuration including a falling-down detection system 1000*c* according to the fifth example embodiment. The falling-down detection system 1000*c* includes vehicles 1001 to 100*n* (n is a natural number equal to or greater than 2), a falling-down detection apparatus 200*c*, and an emergency system 300. The vehicle 1001 includes an on-board camera 101; the vehicle 1002 includes an on-board camera 102: . . . ; and the vehicle 100*n* includes an on-board camera 10*n*. It is assumed that the functions of the on-board cameras 101 to 10*n* are equivalent to each other. The on-board cameras 101 to 10*n*, the falling-down detection apparatus 200*c*, and the emergency system 300 are connected to each other through a network N so that they can communicate with each other.

Similarly to the falling-down detection apparatus 200*a* shown in FIG. 7, the falling-down detection apparatus 200*c* is installed as a server near the vehicle. Therefore, each of the on-board cameras 101 to 10*n* transmits a photographed image to the falling-down detection apparatus 200*c* through the network N. The falling-down detection apparatus 200*c* analyzes a plurality of images acquired from the on-board cameras 101 to 10*n*, respectively, present in a predetermined area, and determines whether or not a person shown in the images is lying down in a comprehensive manner.

Figure 11:
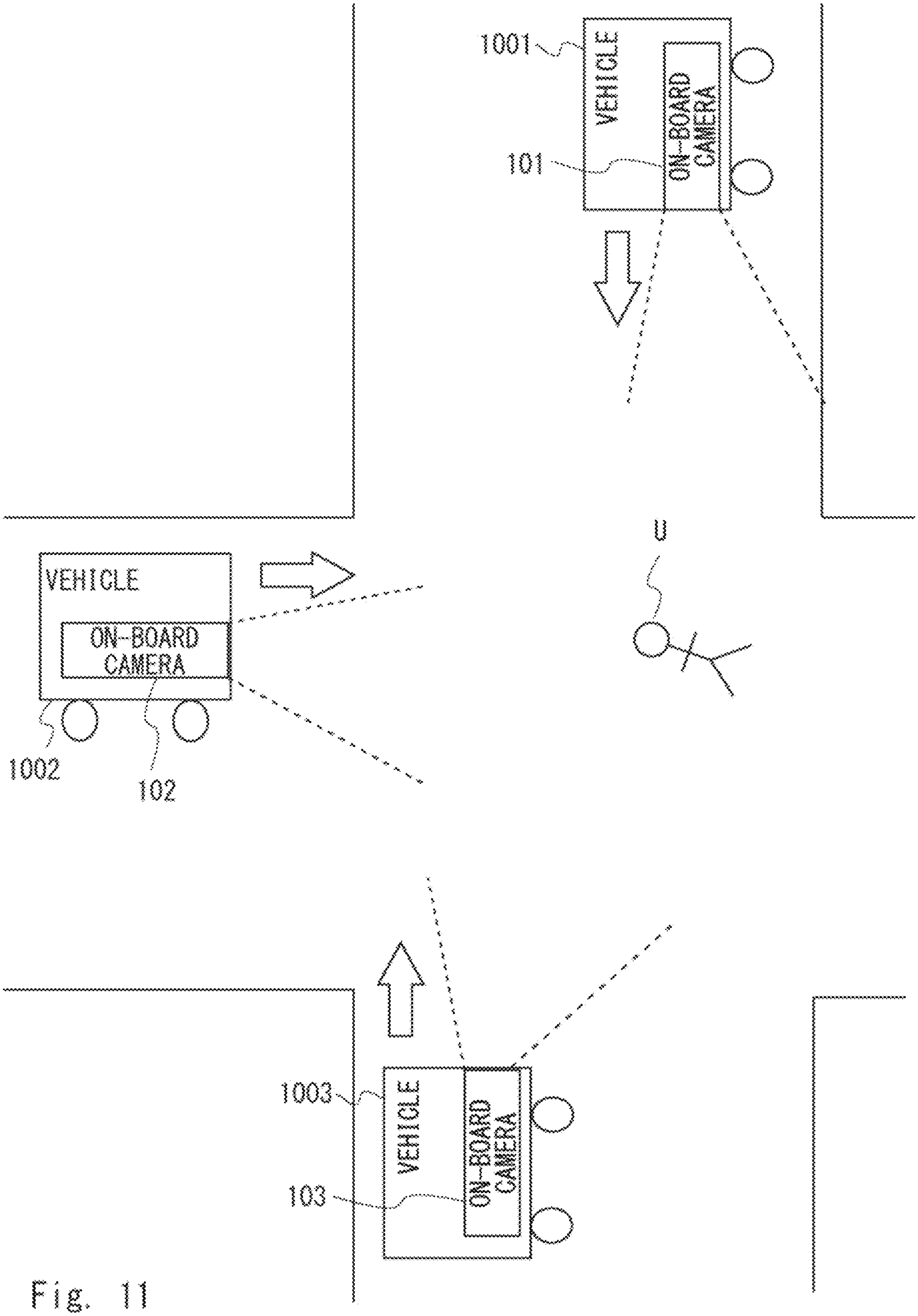
FIG. 11 shows an example of a positional relationship between a person on a roadway and a plurality of vehicles according to the fifth example embodiment.

FIG. 11 shows an example of a positional relationship between a person U and a plurality of vehicles 1001 to 1003 on a roadway according to the fifth example embodiment. FIG. 11 shows an example of an intersection, and it is assumed that the person U is present ahead of the vehicles 1001 and 1002 in their traveling directions. Therefore, the person U, together with the roadway, is included (i.e., shown) in the shooting ranges of both the on-board camera 101 of the vehicle 1001 and the on-board camera 102 of the vehicle 1002. Further, the vehicle 1003 is traveling in a direction opposite to the traveling direction of the vehicle 1001. Therefore, the person U, together with the roadway, is also included (i.e., shown) in the shooting range of the on-board camera 103 of the vehicle 1003. That is, the same roadway (the same intersection) and the person U are included (i.e., shown) in each of a first image taken by the on-board camera 101, a second image taken by the on-board camera 102, and a third image taken by the on-board camera 103. Note that although FIG. 11 shows an example in which the person U is present on the roadway, this example embodiment can also be applied to a case in which a person U is present on a road other than the roadway, such as a sidewalk.

Figure 12:
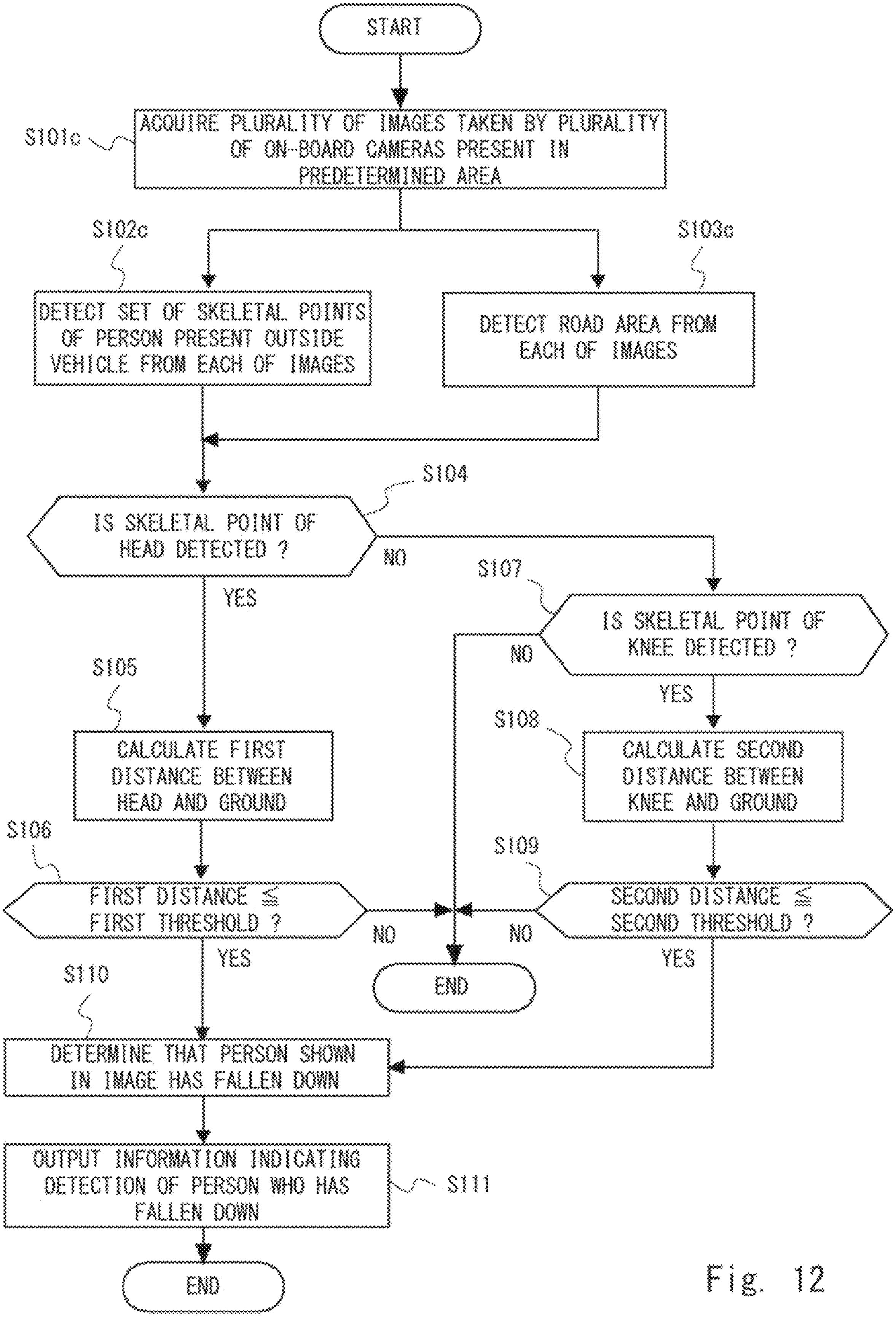
FIG. 12 is a flowchart showing a flow of a falling-down detection process according to the fifth example embodiment.

FIG. 12 is a flowchart showing a flow of a falling-down detection process according to the fifth example embodiment. Firstly, the falling-down detection apparatus 200*c* acquires a plurality of images taken by a plurality of on-board cameras present in a predetermined area (S101*c*). Next, the falling-down detection apparatus 200*c* detects, from each of the images, a set of skeletal points of a person present near the vehicle (S102*c*). Further, the falling-down detection apparatus 200*c* detects a road area from each of the images (S103*c*). For example, the falling-down detection apparatus 200*c* acquires first to third images taken by the on-board cameras 101 to 103, respectively. Then, the falling-down detection apparatus 200*c* detects a set of skeletal points of a person U from each of the first to the third images. It is assumed that, for example, some of the skeletal points of the person U are detected from the first image, and some of the skeletal points of the person U are also detected from each of the second and third images. Then, the falling-down detection apparatus 200*c* combines these detected skeletal points into a set of skeletal points. Therefore, positions of some of the skeletal points may coincide with each other. Further, the falling-down detection apparatus 200*c* detects a road area from each of the first to the third images. Then, the falling-down detection apparatus 200*c* combines the positions of these detected road areas and thereby detect them as the road area.

After steps S102*c* and S103*c*, steps S104 to S111 are performed in a manner similar to that shown in FIG. 5. Therefore, when it is determined that the person U has fallen down, the falling-down detection apparatus 200*c* transmits information indicating the detection of the person who has fallen down and the position information of the vehicle 1001 and the like to the emergency system 300 through the network N. Note that the falling-down detection apparatus 200*c* may calculate a falling-down continuation time period based on a determination result (detection result) from images of a plurality of on-board cameras in a manner similar to that in the above-described fourth example embodiment.

As described above, in the fifth example embodiment, the falling-down detection apparatus 200*c* collects photographed images from a plurality of on-board cameras of a plurality of vehicles, and detects a person who has fallen down from the collected images. That is, the falling-down detection apparatus 200*c* performs a falling-down detection process by combining (aggregating or integrating) images from a plurality of on-board cameras. Therefore, compared with the case where an image from one on-board camera is used, it is possible to detect skeletal points of a person and a road area in a plurality of directions, and thereby to detect a person who has fallen down more accurately.

Other Example Embodiment

In the above-described examples, the program includes a set of instructions (or software codes) that, when being loaded into a computer, causes the computer to perform one or more of the functions described in the example embodiments. The program may be stored in a non-transitory computer readable medium or in a physical storage medium. By way of example rather than limitation, a computer readable medium or a physical storage medium may include a random-access memory (RAM), a read-only memory (ROM), a flash memory, a solid-state drive (SSD), or other memory technology, a CD-ROM, a digital versatile disc (DVD), a Blu-ray (registered trademark) disc or other optical disc storages, a magnetic cassette, magnetic tape, and a magnetic disc storage or other magnetic storage devices. The program may be transmitted on a transitory computer readable medium or a communication medium. By way of example rather than limitation, the transitory computer readable medium or the communication medium may include electrical, optical, acoustic, or other forms of propagating signals.

Note that the present disclosure is not limited to the above-described example embodiments and various changes may be made therein without departing from the spirit and scope of the present disclosure. Further, the present disclosure may be implemented by combining example embodiments with one another.

The whole or part of the example embodiments disclosed above can be described as, but not limited to, the following Supplementary note.

Supplementary Note A1

A falling-down detection apparatus comprising:

first detection means for detecting a skeletal point of a person present near a vehicle from a first image taken by a first on-board camera;

second detection means for detecting a road area indicating an area of a road from the first image; and determination means for determining whether or not the person is lying down on the road based on a positional relationship between the skeletal point and the road area.

Supplementary Note A2

The falling-down detection apparatus described in Supplementary note A1, further comprising first calculation means for calculating, when a skeletal point of a head of the person is detected by the first detection means, a first distance of the skeletal point of the head from a ground based on the road area, wherein when the first distance is equal to or shorter than a first threshold, the determination means determines that the person is lying down.

Supplementary Note A3

The falling-down detection apparatus described in Supplementary note A1 or A2, further comprising second calculation means for calculating, when a skeletal point of a knee of the person is detected by the first detection means, a second distance of the skeletal point of the knee from a ground based on the road area, wherein when the second distance is equal to or shorter than a second threshold, the determination means determines that the person is lying down.

Supplementary Note A4

The falling-down detection apparatus described in Supplementary note A3, wherein when the skeletal point of the head of the person has not been detected by the first detection means, the determination means determines whether or not the second distance is equal to or shorter than the second threshold.

Supplementary Note A5

The falling-down detection apparatus described in any one of Supplementary notes A1 to A4, further comprising:

third calculation means for calculating, when it is determined that the person is lying down based on a positional relationship between the skeletal point detected from the first image and the road area, a falling-down continuation time period of the person based on a first subsequent image taken after the first image is taken; and notification means for sending, when the falling-down continuation time period is equal to or longer than a predetermined time period, a notification to that effect to a predetermined notification destination.

Supplementary Note A6

The falling-down detection apparatus described in any one of Supplementary notes A1 to A5, wherein the determination means determines whether or not the person is lying down on the road based also on a positional relationship between the skeletal point detected from a second image taken by a second on-board camera mounted on a second vehicle other than the first vehicle including the first on-board camera mounted thereon and the road area.

Supplementary Note A7

The falling-down detection apparatus described in any one of Supplementary notes A1 to A6, wherein the determination means uses a distance of the skeletal point from a ground calculated from the position of the skeletal point and the position of the road area as the positional relationship.

Supplementary Note B1

A falling-down detection system comprising:

a first on-board camera; and a falling-down detection apparatus, wherein the falling-down detection apparatus comprises:

first detection means for detecting a skeletal point of a person present near a vehicle from a first image taken by the first on-board camera;

second detection means for detecting a road area indicating an area of a road from the first image; and determination means for determining whether or not the person is lying down on the road based on a positional relationship between the skeletal point and the road area.

Supplementary Note B2

The falling-down detection system described in Supplementary note B1, wherein the first detection means detects at least a skeletal point of a knee of the person, and when a distance of the skeletal point of the knee from a ground is equal to or shorter than a first threshold based on the road area, the determination means determines that the person is lying down.

Supplementary Note C1

A falling-down detection method, wherein a computer:

detects a skeletal point of a person present near a vehicle from a first image taken by a first on-board camera;

detects a road area indicating an area of a road from the first image; and determines whether or not the person is lying down on the road based on a positional relationship between the skeletal point and the road area.

Supplementary Note D1

A non-transitory computer readable media storing a falling-down detection program for causing a computer to perform:

a first detection process for detecting a skeletal point of a person present near a vehicle from a first image taken by a first on-board camera;

a second detection process for detecting a road area indicating an area of a road from the first image; and a determination process for determining whether or not the person is lying down on the road based on a positional relationship between the skeletal point and the road area.

Although the present invention has been described with reference to example embodiments (and examples), the present invention is not limited to the above-described example embodiments (and examples). The configuration and details of the present invention may be modified within the scope of the present invention in various ways that can be understood by those skilled in the art.

REFERENCE SIGNS LIST

1 FALLING-DOWN DETECTION APPARATUS
11 FIRST DETECTION UNIT
12 SECOND DETECTION UNIT
13 DETERMINATION UNIT
1000 FALLING-DOWN DETECTION SYSTEM
1001 VEHICLE
1002 VEHICLE
1003 VEHICLE
**100*n*** VEHICLE
100 ON-BOARD CAMERA
101 ON-BOARD CAMERA
102 ON-BOARD CAMERA
103 ON-BOARD CAMERA
**10*n*** ON-BOARD CAMERA
200 FALLING-DOWN DETECTION APPARATUS
210 STORAGE UNIT
211 FALLING-DOWN DETECTION PROGRAM
212 FIRST THRESHOLD
213 SECOND THRESHOLD
220 MEMORY
230 IF UNIT
240 CONTROL UNIT
241 ACQUISITION UNIT
242 FIRST DETECTION UNIT
243 SECOND DETECTION UNIT
244 DETERMINATION UNIT
245 CALCULATION UNIT
246 OUTPUT UNIT
300 EMERGENCY SYSTEM
N NETWORK
U PERSON
5 PHOTOGRAPHED IMAGE
51 SET OF SKELETAL POINTS
511 SKELETON POINT
512 SKELETON POINT
513 SKELETON POINT
52 ROAD AREA
**1000*a*** FALLING-DOWN DETECTION SYSTEM
**200*a*** FALLING-DOWN DETECTION APPARATUS
**200*b*** FALLING-DOWN DETECTION APPARATUS
**211*b*** FALLING-DOWN DETECTION PROGRAM
**245*b*** CALCULATION UNIT
**246*b*** OUTPUT UNIT
**1000*c*** FALLING-DOWN DETECTION SYSTEM
**200*c*** FALLING-DOWN DETECTION APPARATUS

What is claimed is:

1. A falling-down detection apparatus comprising:
at least one storage device configured to store instructions; and
at least one processor configured to execute the instructions to:
detect a skeletal point of a person present near a first vehicle from a first image taken by a first on-board camera;
detect a roadway area indicating an area of a roadway and a sidewalk area indicating an area of a sidewalk from the first image; and
determine whether or not the person present in the roadway area is lying down on the roadway area based on a positional relationship between the skeletal point of the person and the roadway area,
wherein the at least one processor is further configured to execute the instructions to:
calculate, when it is determined that the person is lying down based on a positional relationship between the skeletal point detected from the first image and the roadway area, a falling-down continuation time period of the person based on a first subsequent image taken after the first image is taken;
send, in a case that the falling-down continuation time period is equal to or longer than a predetermined time period, a notification to that effect to a predetermined notification destination; and
clear the falling-down continuation time period in a case that a number of times of the person did not fall reaches a predetermined number of times during a measurement of a fall duration.

2. The falling-down detection apparatus according to claim 1,
wherein the at least one processor is further configured to execute the instructions to:
calculate, when a skeletal point of a head of the person is detected, a first distance of the skeletal point of the head from a ground based on the roadway area, wherein
when the first distance is equal to or shorter than a first threshold, determine that the person is lying down.

3. The falling-down detection apparatus according to claim 1,
wherein the at least one processor is further configured to execute the instructions to:
calculate, when a skeletal point of a knee of the person is detected, a second distance of the skeletal point of the knee from a ground based on the roadway area, and
when the second distance is equal to or shorter than a second threshold, determine that the person is lying down.

4. The falling-down detection apparatus according to claim 3,
wherein the at least one processor is further configured to execute the instructions to:
when the skeletal point of a head of the person has not been detected, determine whether or not the second distance is equal to or shorter than the second threshold.

5. The falling-down detection apparatus according to claim 1,
wherein the at least one processor is further configured to execute the instructions to:
determine whether or not the person is lying down on the roadway area based also on a positional relationship between the skeletal point detected from a second image taken by a second on-board camera mounted on a second vehicle other than the first vehicle including the first on-board camera mounted thereon and the roadway area.

6. The falling-down detection apparatus according to claim 1,
wherein the at least one processor is further configured to execute the instructions to:
use a distance of the skeletal point from a ground calculated from a position of the skeletal point and a position of the roadway area as the positional relationship.

7. A falling-down detection method, wherein a computer:
detects a skeletal point of a person present near a vehicle from a first image taken by a first on-board camera;

detects a roadway area indicating an area of a roadway and a sidewalk area indicating an area of a sidewalk from the first image; and determines whether or not the person present in the roadway area is lying down on the roadway area based on a positional relationship between the skeletal point of the person and the roadway area, wherein the computer further:

calculates, when it is determined that the person is lying down based on a positional relationship between the skeletal point detected from the first image and the roadway area, a falling-down continuation time period of the person based on a first subsequent image taken after the first image is taken;

sends, in a case that the falling-down continuation time period is equal to or longer than a predetermined time period, a notification to that effect to a predetermined notification destination; and clears the falling-down continuation time period in a case that a number of times of the person did not fall reaches a predetermined number of times during a measurement of a fall duration.

8. A non-transitory computer readable media storing a falling-down detection program for causing a computer to perform:

a first detection process for detecting a skeletal point of a person present near a vehicle from a first image taken by a first on-board camera;

a second detection process for detecting a roadway area indicating an area of a roadway and a sidewalk area indicating an area of a sidewalk from the first image; and a first determination process for determining whether or not the person present in the roadway area is lying down on the roadway area based on a positional relationship between the skeletal point of the person and the roadway area, wherein the falling-down detection program further causes the computer to perform:

a calculation process, when it is determined that the person is lying down based on a positional relationship between the skeletal point detected from the first image and the roadway area, a falling-down continuation time period of the person based on a first subsequent image taken after the first image is taken;

a send process, in a case that the falling-down continuation time period is equal to or longer than a predetermined time period, a notification to that effect to a predetermined notification destination, and a clear process, the falling-down continuation time period in a case that a number of times of the person did not fall reaches a predetermined number of times during a measurement of a fall duration.

* * * * *